Patented Mar. 28, 1950

2,501,827

UNITED STATES PATENT OFFICE 2,501,827

COATING COMPOSITION

Betty Oberdorfer Newman, Schenectady, N. Y., now by judicial change of name Betty Oberdorfer, assignor to National Gypsum Company, Buffalo, N. Y., a corporation of Delaware No Drawing. Application July 25, 1947, Serial No. 763,757

2 Claims. (Cl. 106—154)

This invention relates to a coating composition and more particularly to a dry powdered water paint composition containing a protein binder.

Heretofore such dry powdered water paints have contained casein as the binder with resulting undesirable properties. Accordingly, the object of the present invention is to overcome such undesirable properties, this being achieved by improving the ease of mixing the dry powdered paint with water, by eliminating the formation of dry, undispersed pigments during the mixing and dissolving process, by preventing settling of the let-down paint, and by improving the viscosity and water-holding capacity thereof.

Other objects and advantages of the invention will be apparent from the following description:

The present invention provides a composition in powdered form adapted to form a liquid coating composition upon the addition of water and which comprises a mixture in finely divided, chemically uncombined form of substantially pure soybean protein, sodium fluoride, anhydrous sodium borate, calcium hydroxide, fillers and pigments. A deodorant and anti-foam agent can also be embodied in the mixture. It is preferred that the various ingredients comprising the mixture be in the following proportions indicated as percentages by weight: 5–15% of substantially pure soybean protein; 0.5–3% of sodium fluoride; 0.5–3% of anhydrous sodium borate; 2–20% of calcium hydroxide; 0.5–2% of deodorant and anti-foam agent; the remainder of the mixture consisting of mineral fillers and pigments.

The substantially pure soybean protein serves as a vehicle and binder for holding the pigments on the surface to be painted. It is superior to the commonly used milk protein, casein, in preventing settling of the let-down paint. Substantially pure soybean protein, furthermore, results in a paint which has a higher let-down viscosity and, therefore, has less tendency to drip off the brush during application and to sag on the wall or ceiling during application and drying.

The combination of sodium fluoride and anhydrous sodium borate used in conjunction with calcium hydroxide or hydrated lime serve as solvents for the substantially pure soybean protein and produce a paint which, when mixed with water, is exceptionally free from lumping. This particular combination of solvents, furthermore, protects the paint against microbiological attack and eliminates the need for any additional preservatives. This preferred solvent combination also yields a paint with excellent wet abrasion resistance.

The fillers employed are those well known in the art, such as clay, asbestine, mica, etc.

The pigments employed can be any of the pigments well known in the art to provide the desired color to the paint.

The following example illustrates but does not limit the invention:

| Material | Pounds |
| --- | --- |
| Substantially pure soybean protein | 85 |
| Pine oil | 10 |
| Calcium hydroxide | 50 |
| Sodium fluoride | 10 |
| Anhydrous sodium borate | 10 |
| Fillers (clay, abestine, mica, etc.) | 650 |
| Prime white pigments (titanium dioxide, zinc sulfide etc.) | 851 |
| | 1,000 |

The improved let-down viscosity of the above example was measured by the "viscosity cup method," which consists of noting the time required for delivery of a measured volume of liquid at a standard temperature through a standard orifice. Casein was substituted for the substantially pure soybean protein in the above example, and the following comparisons were noted:

Seconds
Time for delivery of tap water _____ 36
Time for delivery of casein powder paint letdown 1 to 1 by weight with tap water _____ 43
Time for delivery of substantially pure soybean protein powder paint let-down 1 to 1 by weight with tap water _____ 68

It will therefore be seen that conventional casein paint is nearly as thin as water whereas the substantially pure soybean protein paint forming the subject of the present invention has a higher and more desirable viscosity. In connection with the use of such conventional casein paint, it is recommended that water soluble gums such as Irish moss be added to improve the viscosity of the paint. However, such gums remain water soluble in the dried paint film, thereby detracting from the water resistance of the coating.

With reference to the wet abrasion resistance properties of paint made in accordance with the present invention, Federal Specification TT-P-23a, for example, requires a minimum wet abrasion resistance of 15 oscillations for this type of paint, this being the number of strokes of an oscillating brush engaging a water immersed surface coated with the particular paint being tested. The substantially pure soybean protein paint set forth in the above example will withstand 175 oscillations.

The pine oil employed in the above example prevents foaming and serves as a deodorant. The fillers and pigments used are those well known in the art.

The term "substantially pure soybean protein" as used herein and in the appended claims is intended to define a chemically isolated protein derived from the soybean and being substantially pure, having a purity in the order of 98%. Such protein is known in the trade as "alpha protein."

Having thus described the invention it will be understood that the details need not be strictly adhered to but that various changes and modifications will suggest themselves to one skilled in the art, all falling within the scope of the invention as defined in the subjoined claims.

I claim:

1. A composition in powdered form adapted to readily form a liquid coating composition of smooth consistency upon the addition of water, consisting of a mixture in finely divided form of from 5-15% by weight of substantially pure soybean protein, from 0.5-3% by weight of sodium fluoride, from 0.5-3% by weight of anhydrous sodium borate, from 2-20% by weight of calcium hydroxide, from 0.5-2% by weight of deodorant and anti-foam agent, and the remainder being of mineral fillers and pigments.

2. A composition in powdered form adapted to readily form a liquid coating composition of smooth consistency upon the addition of water, consisting of a mixture in finely divided form in the order of 8.5% by weight of substantially pure soybean protein, in the order of 1% by weight of sodium fluoride, in the order of 1% by weight of anhydrous sodium borate, in the order of 5% by weight of calcium hydroxide, in the order of 1% by weight of pine oil, and in the order of 83.5% by weight of mineral fillers and pigments.

BETTY OBERDORFER NEWMAN.

REFERENCES CITED

The following references are of record in the file of this patent:

UNITED STATES PATENTS

| Number | Name | Date |
|---|---|---|
| 2,304,102 | Julian et al. | Dec. 8, 1942 |

FOREIGN PATENTS

| Number | Country | Date |
|---|---|---|
| 112,209 | Australia | Jan. 9, 1941 |
| 115,770 | Australia | Sept. 3, 1942 |

Certificate of Correction

Patent No. 2,501,827                                          March 28, 1950

BETTY OBERDORFER NEWMAN

It is hereby certified that error appears in the printed specification of the above numbered patent requiring correction as follows:

Column 2, line 18, last column of table, for the numeral "851" read *185*;

and that the said Letters Patent should be read with this correction therein that the same may conform to the record of the case in the Patent Office.

Signed and sealed this 5th day of September, A. D. 1950.

[SEAL]

THOMAS F. MURPHY,
*Assistant Commissioner of Patents.*